United States Patent
Nemeth et al.

(10) Patent No.: US 6,520,056 B1
(45) Date of Patent: Feb. 18, 2003

(54) METHOD AND APPARATUS FOR CUTTING OPTICAL FILMS HAVING PRECISION ALIGNMENT OF OPTICAL AXES WITH OPTICAL FILM EDGES

(75) Inventors: Paul R. Nemeth, Cedar Rapids, IA (US); James D. Sampica, Central City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/384,003

(22) Filed: Aug. 26, 1999

(51) Int. Cl.7 ............................. B26D 5/00; G01J 4/00
(52) U.S. Cl. ........................ 83/72; 83/75.5; 83/76.8; 83/365; 83/368; 250/225; 356/364
(58) Field of Search ................. 83/75.5, 72, 936, 83/76.8, 940, 365, 361, 364, 368, 370, 371, 948; 250/221, 225; 340/500–693.12; 264/1.31, 1.34; 359/483; 356/453, 364–370

(56) References Cited

U.S. PATENT DOCUMENTS

| | | | | |
|---|---|---|---|---|
| 3,345,907 A | * | 10/1967 | Wada | 356/323 |
| 4,309,110 A | * | 1/1982 | Tumerman | 356/365 |
| 4,436,207 A | * | 3/1984 | Klukis | 209/577 |
| 4,521,111 A | * | 6/1985 | Paulson et al. | 356/367 |
| 4,631,408 A | * | 12/1986 | Zelmanovic et al. | 250/339.11 |
| 4,684,256 A | * | 8/1987 | Tsumura et al. | 356/367 |
| 5,258,917 A | * | 11/1993 | Bruder et al. | 700/171 |
| 5,408,321 A | * | 4/1995 | Paulson, Jr. | 356/366 |
| 5,420,413 A | * | 5/1995 | Fields | 250/214 PR |
| 6,158,319 A | * | 12/2000 | D'Silva | 83/397 |
| 2002/0063829 A1 | * | 5/2002 | Manabe et al. | 349/117 |

* cited by examiner

Primary Examiner—Boyer D. Ashley
(74) Attorney, Agent, or Firm—Nathan O. Jensen; Kyle Eppele

(57) ABSTRACT

A system and method for fabricating a polarizer for use in an LCD, which includes cutting said polarizer so that an absorption axis of the polarizer is aligned with an edge of the polarizer by using an optical sensor, coupled to a cutting machine, where the optical sensor uses a rotating reference polarizer to determine a null point of transmission through the polarizer and thereby determine any offset of the absorption axis with respect to an edge of the polarizer.

6 Claims, 1 Drawing Sheet

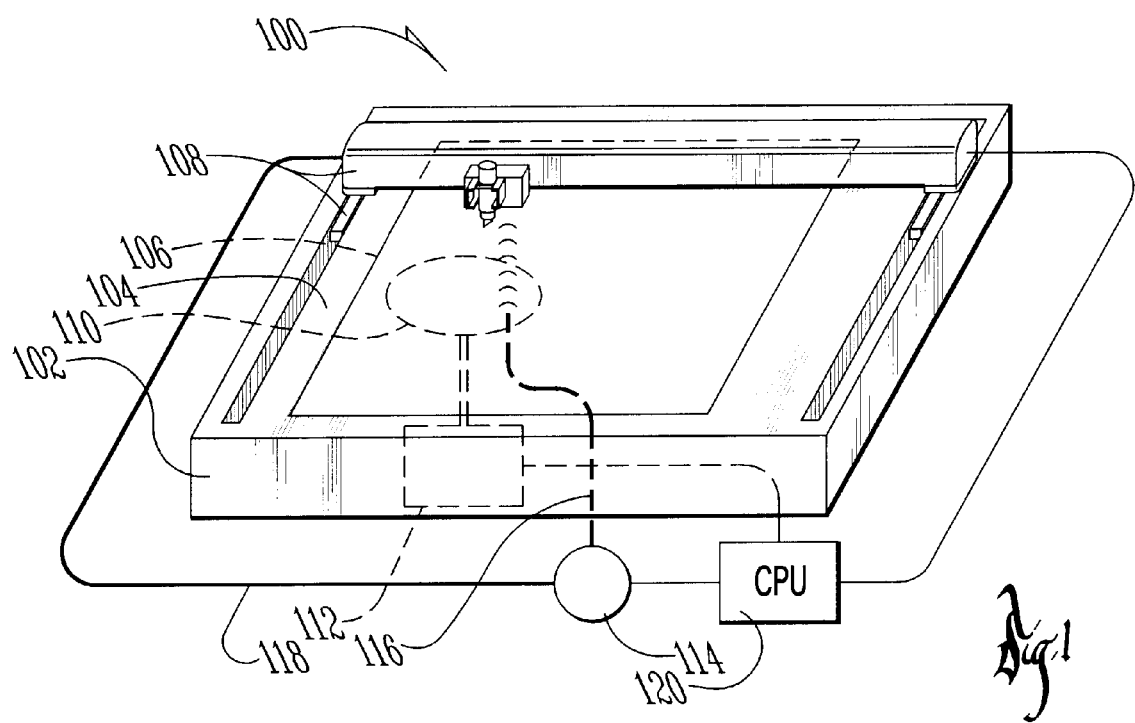

METHOD AND APPARATUS FOR CUTTING OPTICAL FILMS HAVING PRECISION ALIGNMENT OF OPTICAL AXES WITH OPTICAL FILM EDGES

FIELD OF THE INVENTION

The present invention generally relates to optical films, and more particularly relates to measuring of and cutting of optical films, and even more particularly relates to methods and apparatuses for precision measuring and cutting of optical films to provide for precise alignment of optical axes with edges of the film.

BACKGROUND OF THE INVENTION

In the past, optical films have been used to enhance the performance of liquid crystal displays and other optical devices. Avionics engineers have routinely endeavored to enhance the optical performance of such liquid crystal displays. When multiple optical films are used in which each film has a predetermined optical characteristic, it is often desirable to attempt to align these films during the assembly process. A common approach has been to accept the manufacturer's tolerances of orientation of the optical axes with respect to the edges of the films and then use these edges to align the optical axes.

While this approach has benefits of simplicity and ease of use, it also has significant drawbacks. A significant problem of this type of approach is that it may allow an excessive amount of angular tolerance to accumulate between films, especially with compensation modules having multiple films and the most rigorous performance specifications.

Consequently, there exists a need for improved methods and apparatuses for aligning optical films in a multi-film LCD.

SUMMARY OF THE INVENTION

It is an object of the present invention to provide high performance LCDs.

It is a feature of the present invention to utilize a sensor coupled to a cutting machine; the sensor is used for measuring optical characteristics of a film to be cut by the cutting machine.

It is an advantage of the present invention to achieve more precise angular alignment of the various optical axes of numerous films with respect to their edges cut by a cutting machine.

It is another feature to use an LED and sensor to measure optical characteristics of such films.

It is another advantage of the present invention to provide high angular resolution of the optical axes with respect to edges of an optical film which are cut by a cutting machine.

The present invention is an apparatus and method for measuring and cutting optical films which are designed to satisfy the aforementioned needs, provide the previously stated objects, include the above-listed features and achieve the already articulated advantages. Accordingly, the present invention is a method and apparatus which includes a sensor, disposed on a cutting machine, for measuring light transmitted through a film, and generating an optical axis alignment signal which is then used in the process of cutting optical films.

BRIEF DESCRIPTION OF THE DRAWINGS

The invention may be more fully understood by reading the following description of the preferred embodiments of the invention, in conjunction with the appended drawings wherein:

FIG. 1 is a simplified perspective drawing of the optical film cutting machine of the present invention, with sensor for measuring light transmitted through a film disposed thereon.

DETAILED DESCRIPTION

Now referring to the drawings, wherein like numerals refer to like matter throughout, there is shown in FIG. 1, an optical film cutting machine, generally designated 100, having a cutting surface 102 for receiving on a cutting surface top 104 thereon a polarizer work piece 106, which is to be cut using xy gantry 108. The description throughout is focused upon an optical film to be cut, which is a polarizer; however, other optical films, such as compensating films etc., could be used as well. Cutting machines of the type having cutting surface 102 and xy gantry 108, with cutting tips thereon, are well known in the art and are commercially available for purchase from several well-known manufacturers. Located below the cutting surface 102 is a rotating reference polarizer 110, which is used to determine the absorption lines of polarizer work piece 106. Similarly, any other angularly dependent optical film could be used as a reference when the work piece is another type of film. Rotating reference polarizer 110 is rotated by reference polarizer rotating motor 112 through a range preferably of more than plus or minus 10 degrees. When polarizer work piece 106 and rotating reference polarizer 110 are aligned in a predetermined manner, light passing through both will reach a minimum intensity. This corresponds to an absorption line of polarizer work piece 106 being crossed with respect to an absorption line of rotating reference polarizer 110. Rotating reference polarizer 110 may be disposed at a fixed location under cutting surface 102, as shown, or it may be disposed on a second lower xy gantry, not shown. It is believed that a second xy gantry is not necessary for operation of the present invention. In fact, it is preferred that rotating reference polarizer 110 be disposed at a central location on the underside of cutting surface 102. Disposed under rotating reference polarizer 110 is receiving optical fiber 116, which captures light passing through rotating reference polarizer 110, and carries such light to light transmitter/receiver 114, which detects the presence of light incident thereon and generates an electrical signal representative of the same. This electrical signal is then provided to central processing unit 120, where it is used to control the cutting operations performed by the xy gantry 108. Light transmitter/receiver 114 also transmits light, via transmitting optical fiber 118, which is carried on xy gantry 108 and then transmitted through polarizer work piece 106 on cutting surface 102 and onto rotating reference polarizer 110. A reference polarizer rotating motor 112 is coupled to rotating reference polarizer 110 for determining an alignment characteristic of polarizer work piece 106. Preferably reference polarizer rotating motor 112 is a stepper motor which can be incrementally moved to predetermined angular positions.

In operation the apparatus of the present invention can be used as follows:

A polarizer work piece 106 to be cut, having an approximately known alignment characteristic of an absorption axis with respect to a cut edge, is placed on cutting surface 102. To precisely align the edge with respect to an absorption line, light is transmitted from light transmitter/receiver 114, carried by transmitting optical fiber 118, and directed through polarizer work piece 106, onto rotating reference polarizer 110. Depending on the orientation of absorption lines in rotating reference polarizer 110 with respect to absorption lines in polarizer work piece 106, light will pass through rotating reference polarizer 110, with varying levels of intensity, and be accumulated by receiving optical fiber 116 and carried to light transmitter/receiver 114, where its intensity is detected and reported to central processing unit 120. To precisely determine the orientation of absorption lines in polarizer work piece 106, rotating reference polarizer 110 is rotated, using reference polarizer rotating motor 112 through various known positions to determine if an intensity null is detected by light transmitter/receiver 114. When this is done, central processing unit 120 determines an angular offset, if any, of the polarizer work piece 106 with respect to an edge. This angular offset is then used to control xy gantry 108 to provide a desired relationship between an absorption line of and a cut edge of polarizer work piece 106. Software to control the normal cutting operations of cutting machine 100, is well known in the art.

It is thought that the method and apparatus of the present invention will be understood from the foregoing description, and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:

1. An apparatus for producing a linear polarizer which has an illuminated side and a non-illuminated side, and which further has a cut edge in alignment with a polarization axis thereof, the apparatus comprising:

an optical film cutting machine for cutting optical films;

a light measuring sensor configured for measuring intensity of light transmitted through said linear polarizer and generating a control signal in response thereto;

said cutting machine having a controller for controlling a shape characteristic of said linear polarizer, wherein said controller is responsive to said control signal;

wherein said light measuring sensor is disposed on the non-illuminated side of said linear polarizer;

an optical fiber, at least optically coupled to said light measuring sensor, for transmitting optical signals representative of light passing through said linear polarizer;

a linear polarized lens; and wherein said optical fiber comprises a first end, at least optically coupled to said light measuring sensor and a second end, at least optically coupled to said linear polarized lens;

said linear polarized lens is configured to be rotated so that a first absorption line of said linear polarized lens is crossed with a second absorption line of said linear polarizer when said light measuring sensor detects a minimum intensity level of light passing through said linear polarizer and said linear polarized lens.

2. An apparatus of claim 1 wherein said light source is an LED.

3. An apparatus of claim 1 wherein said linear polarized lens is adjustably oriented with respect to said second end of said optical fiber.

4. An apparatus of claim 3 wherein said linear polarized lens is rotatably oriented with respect to said second end.

5. An apparatus of claim 4 wherein said linear polarized lens is mechanically coupled to a stepper motor to provide for rotation of at least 10 degrees with respect to said second end.

6. An apparatus of claim 4, wherein said cutting machine is responsive to a computer-aided design program.

* * * * *